US012007133B2

(12) United States Patent
O'Reilly et al.

(10) Patent No.: US 12,007,133 B2
(45) Date of Patent: Jun. 11, 2024

(54) SENSOR ARRAY ENVIRONMENT FOR AN AIR HANDLING UNIT

(71) Applicant: American Air Filter Company, Inc., Louisville, KY (US)

(72) Inventors: Sean O'Reilly, Louisville, KY (US); Michael W. Osborne, Louisville, KY (US)

(73) Assignee: AMERICAN AIR FILTER COMPANY, INC., Louisville, KY (US)

( * ) Notice: Subject to any disclaimer, the term of this patent is extended or adjusted under 35 U.S.C. 154(b) by 248 days.

(21) Appl. No.: 16/625,960

(22) PCT Filed: Jun. 29, 2018

(86) PCT No.: PCT/US2018/040370
§ 371 (c)(1),
(2) Date: Dec. 23, 2019

(87) PCT Pub. No.: WO2019/006350
PCT Pub. Date: Jan. 3, 2019

(65) Prior Publication Data
US 2020/0173679 A1    Jun. 4, 2020

Related U.S. Application Data

(60) Provisional application No. 62/526,822, filed on Jun. 29, 2017.

(51) Int. Cl.
*F24F 11/39*    (2018.01)
*F24F 11/65*    (2018.01)
(Continued)

(52) U.S. Cl.
CPC .............. *F24F 11/39* (2018.01); *F24F 11/65* (2018.01); *H04L 12/2823* (2013.01);
(Continued)

(58) Field of Classification Search
CPC ...................................................... F24F 11/39
See application file for complete search history.

(56) References Cited

U.S. PATENT DOCUMENTS 6,152,998 A   11/2000  Taylor
6,439,061 B1   8/2002  Nelson et al.
(Continued)

FOREIGN PATENT DOCUMENTS

CA    2606005 C    6/2010
CA    2605469 C    11/2010
(Continued)

OTHER PUBLICATIONS

International Preliminary Report on Patentability in Application No. PCT/US2018/040370, dated Jan. 9, 2020.
(Continued)

*Primary Examiner* — Nathan L Laughlin
(74) *Attorney, Agent, or Firm* — Gray Ice Higdon

(57) ABSTRACT

Methods, apparatus, systems, and computer-readable media are provided for employing an environment of sensor arrays at an air handling unit. Each sensor array can include one or more sensors for collecting data related to a portion of an air handling unit. Additionally, each sensor can be in communication with each other and/or each sensor array can be in communication with a remote server for processing the collected data. The collected data can be correlated in order to identify how various portions of the air handling unit are affected by other portions of the air handling unit and other systems that are external to the air handling unit. For instance, certain properties of motor and/or filter operations can be indicative of heating and/or cooling coil fouling and/or changes in air pressure of rooms served by an air handling unit.

5 Claims, 4 Drawing Sheets

(51) Int. Cl.
*H04L 12/28* (2006.01)
*H04W 4/38* (2018.01)
*F24F 110/10* (2018.01)

(52) U.S. Cl.
CPC ........... *H04L 12/2867* (2013.01); *H04W 4/38* (2018.02); *F24F 2110/10* (2018.01); *H04L 2012/2841* (2013.01)

(56) References Cited

U.S. PATENT DOCUMENTS

| | | | |
|---|---|---|---|
| 7,424,343 | B2 | 9/2008 | Kates |
| 7,517,386 | B2 | 4/2009 | Morse |
| 7,658,787 | B2 | 2/2010 | Morse et al. |
| 7,833,305 | B1 | 11/2010 | Studer |
| 8,037,714 | B2 | 10/2011 | Mann, III et al. |
| 8,146,376 | B1 | 4/2012 | Williams et al. |
| 8,623,117 | B2 | 1/2014 | Zavodny et al. |
| 8,886,489 | B2 | 11/2014 | Patel et al. |
| 9,084,956 | B2 | 7/2015 | Morgan |
| 9,092,040 | B2 | 7/2015 | Fadell et al. |
| 9,188,508 | B1* | 11/2015 | Meyer ............. F24F 11/30 |
| 9,352,065 | B2 | 5/2016 | Habbel |
| 9,534,929 | B1 | 1/2017 | Stamatakis et al. |
| 2005/0005621 | A1* | 1/2005 | Jayadev ............ F24F 11/62 236/46 R |
| 2005/0275547 | A1* | 12/2005 | Kates ............ G08B 21/182 340/605 |
| 2009/0126382 | A1 | 5/2009 | Rubino et al. |
| 2010/0106330 | A1 | 4/2010 | Grohman |
| 2010/0286831 | A1* | 11/2010 | Boudreau ........... F24F 12/006 700/278 |
| 2011/0081273 | A1 | 4/2011 | Sunderland |
| 2012/0120399 | A1* | 5/2012 | Farley ............. G01N 21/534 356/438 |
| 2012/0176954 | A1 | 7/2012 | Hey et al. |
| 2012/0271576 | A1* | 10/2012 | Kamel ............. G01D 4/002 702/62 |
| 2012/0317938 | A1* | 12/2012 | Sullivan ........... B01D 46/4227 55/354 |
| 2012/0318073 | A1 | 12/2012 | Zavodny et al. |
| 2013/0133404 | A1 | 5/2013 | Patel et al. |
| 2013/0158719 | A1 | 6/2013 | McKie et al. |
| 2014/0229017 | A1 | 8/2014 | Oyama |
| 2015/0052978 | A1* | 2/2015 | Beier ............... B01D 46/0086 73/38 |
| 2015/0254958 | A1 | 9/2015 | Sherman et al. |
| 2015/0298041 | A1 | 10/2015 | Morgan |
| 2015/0345821 | A1 | 12/2015 | Alsaleem |
| 2015/0354845 | A1* | 12/2015 | Brown .............. F24F 13/10 236/51 |
| 2016/0045854 | A1 | 2/2016 | Hung et al. |
| 2016/0085248 | A1 | 3/2016 | Gordon et al. |
| 2016/0215996 | A1 | 7/2016 | Blair et al. |
| 2016/0243486 | A1 | 8/2016 | Galsim et al. |
| 2017/0001137 | A1 | 1/2017 | Lans |
| 2017/0081707 | A1* | 3/2017 | Dillon .............. C12Q 1/689 |
| 2019/0234631 | A1* | 8/2019 | Wallace ............. F24F 3/167 |

FOREIGN PATENT DOCUMENTS

| | | |
|---|---|---|
| CA | 2810259 A1 | 9/2014 |
| CN | 203231883 U | 9/2013 |
| DE | 10060669 A1 | 6/2001 |
| EP | 1874431 B1 | 9/2010 |
| EP | 1874434 B1 | 3/2013 |
| EP | 2941008 A1 | 11/2015 |
| EP | 3645949 A1 | 5/2020 |
| ES | 2405613 T3 | 5/2013 |
| JP | 6183831 B2 | 8/2017 |
| WO | 0135190 A2 | 5/2001 |
| WO | 2006107308 A1 | 10/2006 |
| WO | 2015094049 A1 | 6/2015 |
| WO | 201609351 A1 | 1/2016 |
| WO | 2016118914 A1 | 7/2016 |

OTHER PUBLICATIONS

Written Opinion and International Search Report in Application No. PCT/US2018/040370, 17 pages, dated Oct. 8, 2018.

Builders Square Inc, "Air Conditioning, Heating& Refridgeration News," BNP Media, Retrieved from http://dialog.proquest.com/professional/dcview/1051658920?accountid=157282, V.195, N.3, May 15, 1995.

Landsberger, Les, "Considerations for micro air flow pressure sensors: when designing systems using micro air flow differential pressure sensors, don't ignore the hidden specs," Appliance Design 58.7, Jul. 2010.

Ashrae Transactions, "A holistic approach to embed operations & maintenance best practices in the design of critical facilities," Retrieved from: http://dialog.proquest.com/professional/docview/1085483355?accountid=157282, V.117, I.2, Jul. 2011.

Wang, Fulin, et al., "Model-based commissioning for filters in room air-conditioners," Energy and Buildings 37.12, Dec. 2005.

European Patent Office; Communication pursuant to Article 94(3) issued in Application No. 18752886.4, 5 pages, dated May 2, 2022.

* cited by examiner

SENSOR ARRAY ENVIRONMENT FOR AN AIR HANDLING UNIT

TECHNICAL FIELD

The embodiments described herein generally relate to sensor arrays for an air handling unit. Specifically, systems, methods, and apparatuses are set forth herein for providing an environment of sensor arrays for monitoring an air handling unit.

BACKGROUND

Efficiency of air filtration systems and air handling units has often been attributed to the quality of a filter employed. Although the efficacy of an air filtration system substantially relies on the filter, oftentimes other operating metrics are not considered when monitoring an air filtration system or air handling unit for inefficiencies. Moreover, an air handling unit can affect a number of properties of a building served by the air handling unit. Unfortunately, such properties are typically not tracked in current air handling units and, thus, no correlations between the properties and the operation of the air handling units can be identified. As a result, buildings may incorporate a number of different systems designed to improve metrics, such as air quality, without resolving issues with existing systems in the building.

SUMMARY

The present disclosure is generally directed to methods, apparatus, and computer-readable media (transitory and non-transitory) for employing an array of sensors for monitoring various operating parameters of an air handling unit. In some embodiments, a method implemented by one or more processors is set forth as including steps such as generating first data at a first sensor array, wherein the first sensor array is attached to a portion of an air handling unit. The method can also include a step of generating second data at a second sensor array, wherein the second sensor array is attached to a separate portion of the air handling unit than the first sensor array. The first sensor array and the second sensor array can each include multiple different sensors for collecting different types of data associated with operational conditions of the air handling unit. The method can also include causing the first data to be transmitted to the second sensor array, and causing the first data and the second data to be transmitted from the second sensor array to a remote device. Furthermore, the steps of the method can include receiving, from the remote device, an operational metric associated with the different operational conditions of the air handling unit. The operational metric can be generated from at least the first data and the second data. In some instances, the first sensor array can be configured to monitor an air filter of the air handling unit and the second sensor array can be configured to monitor a motor of the air handling unit. Furthermore, the first sensor array can include a particulate material sensor and the second sensor array can include a vibration sensor. The operational metric can be a mold growth estimate for a heating or cooling coil of the air handling unit. In some instances, the method can also include causing a device of the air handling unit to undergo a settings change according to the received operational metric. The device can be an air pump or a vent. Furthermore, the first sensor array can be connected to the second sensor array through a wireless network, and the remote device can be connected to the second sensor array over a separate network than the wireless network. The remote device can store operating specifications of the air handling unit and the operational metric can also be generated from the operating specifications of the air handling unit.

In other implementations, a system is set forth as including a first sensor array comprising (i) a first transmitter and (ii) a first set of sensors for collecting first sensor data associated with an operation of an air handling unit. The system can also include a second sensor array in communication with the first sensor array, the second sensor array comprising (i) a second set of sensors that are different than the first set of sensors and (ii) a second transmitter for receiving, from the first transmitter, the first sensor data collected by the first set of sensors. The first sensor array and the second sensor array can be connected to different portions of the air handling unit. The system can also include a network device in communication with the first sensor array and the second sensor array. The network device can be configured to (i) transmit the first sensor data and second sensor data to a remote computing device for processing, and (ii) receive, from the remote computing device, an operational metric associated with the operation of the air handling unit. The first sensor array can be connected to a filter of the air handing unit and the second sensor array can be connected to an inlet duct or outlet duct of the air handling unit. The operational metric can be associated with an efficiency of a motor and the operation is an air pumping operation performed by the motor. The first sensor array can include a velocity sensor and a dew point sensor, and the second sensor array can include a deposition sensor and a temperature sensor. The system can further include a processor configured to cause the air pumping operation to change according to the operational metric.

In yet other embodiments, a system is set forth as including a first sensor for providing a first signal based on an operation of an air handling unit, and a second sensor for providing a second signal based on the operation of the air handling unit. The first sensor and the second sensor can each monitor different properties of the operation of the air handling unit. The system can also include a transmitter configured to receive data from an air handling device that is external to the air handling unit. Additionally, the system can include a processor configured to: (i) convert the first signal and the second signal into operational data, (ii) cause the transmitter to transmit the operational data and the received data to a remote device, and (iii) control the air handling unit according to an operational metric received from the remote device. The operational metric can be generated by the remote device using at least the operational data and the received data from the air handling device. The air handling device can be an air filtering device, an air humidifying device, or an air de-humidifying device. The processor can be further configured to cause the air handling unit to perform an operation based on the operational metric received from the remote device. Furthermore, the transmitter and the air handling device can be wirelessly connected over a network and measure different operational conditions of the air handling unit. The first sensor can be a pressure sensor and the second sensor can be a pathogen sensor. The operational metric can be an air quality value or a biocontaminant level. The processor can be further configured to cause the transmitter to provide a notification to a separate device that presents the notification at a user interface when the operational metric reaches an operational metric threshold. The first sensor and the second sensor can be parts to a sensor array, and the transmitter can be further configured to receive different data from a separate sensor array that is attached to the air handling unit.

DETAILED DESCRIPTION OF THE INVENTION

Figure 1:
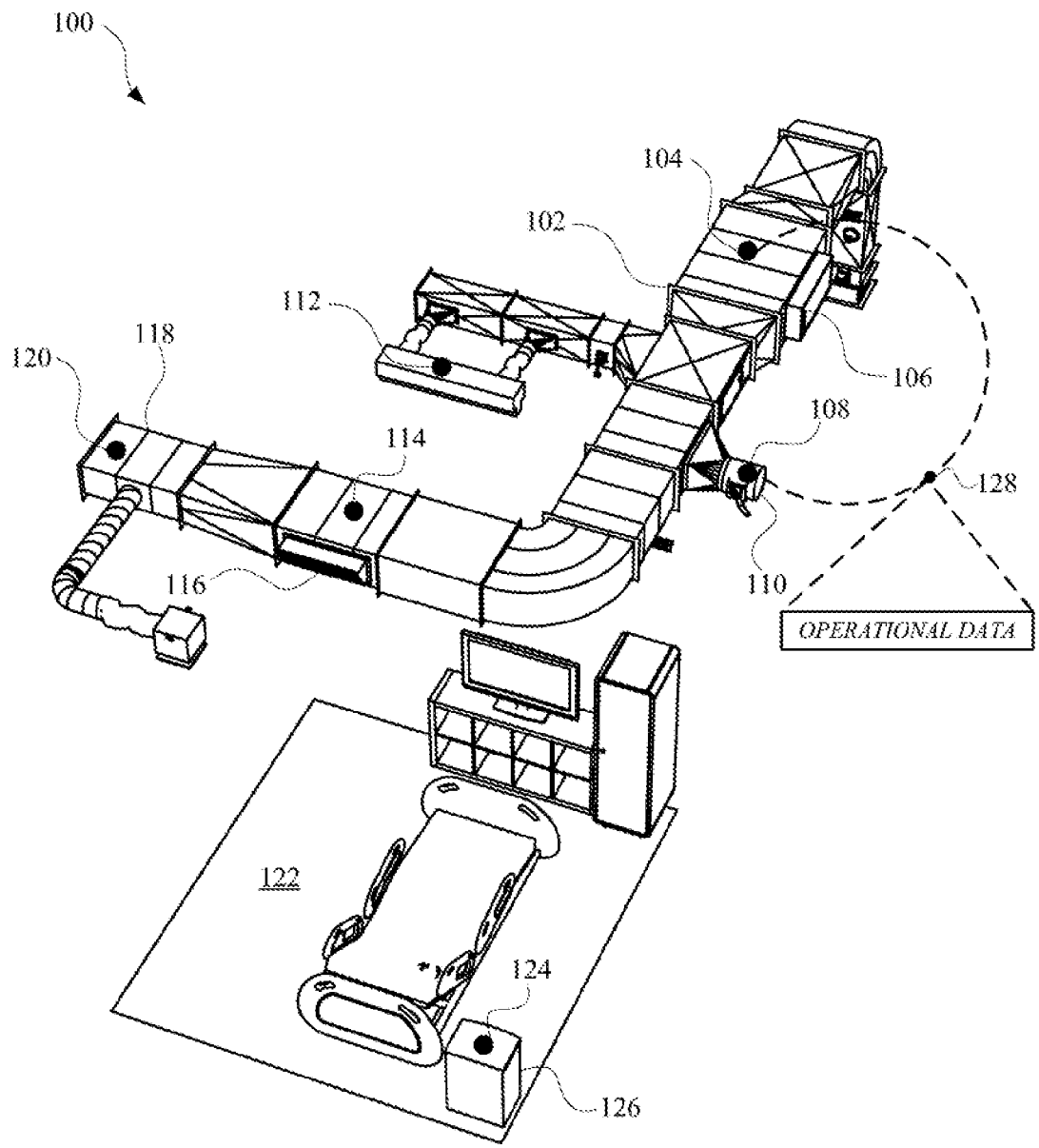
FIG. 1 illustrates a perspective view of an air handling unit that includes multiple sensor arrays.

The described embodiments relate to systems, methods, and apparatuses for employing an array of sensors for monitoring various operating parameters of an air handling unit. Signals from the sensors can be used to generate data that can be used to optimize the performance of the air handling unit in real-time. Furthermore, the data can be used by a computing device interface to present graphics for assisting a user in diagnosing issues with the air handling unit and achieving optimal performance of the air handling unit.

The sensors in the sensor array can monitor a variety of parameters of an air filtration system, as well as any other parameters associated with an operation of an air handling unit. For example, portions of an air handling unit that can be monitored by sensors of the sensor array can include duct work, fan motors, heating coils, cooling coils, humidifiers, air inside and outside the air handling unit, and/or any other feature that can be associated with an air handling unit. In some implementations, the sensor array can includes sensors that monitor air in rooms that are being supplied air from the air handling unit (e.g., hospital rooms and operating rooms, when the air handling unit is installed in a hospital).

Each sensor array can be arranged as a network (e.g., a mesh network), with sensors inside and/or outside the air handling unit, and multiple sensor arrays can be connected as a sensor array system. One or more sensors of a sensor array can be connected to a transmitter that can transmit over the network of sensor arrays to one or more other sensor arrays. The sensor arrays can be battery operated and the transmitters can be wireless transmitters. In this way, power and transmission cables do not need to be located near the air handling unit. Rather, the sensor arrays can be attached to any location on the air handling unit suitable for a sensor to collect data relevant to the operation of the air handling unit.

Each sensor array can include multiple different sensors that are selected according to an installation location of each sensor array in the air handling unit. For instance, a flow sensor array can include a gas sensor, a particulate material (PM) sensor, a velocity sensor, a temperature sensor, and/or a relative humidity sensor. The flow sensor array can be connected at an air intake and/or air output of the air handling unit. In this way, the flow sensor array can provide velocity data related to gas and contaminants, as well as temperature and humidity data, which can be influenced by an amount of gas and contaminants entering an air handling unit.

In some instances, a filter sensor array can be part of the sensor array system connected to the air handling unit. The filter sensor array can include a resistance sensor, a gas sensor, a PM sensor, a velocity sensor, temperature and/or relative humidity sensor, a dew point sensor, and/or a mold growth sensor. The filter sensor array can be located at each filter of an air filtration system of an air handling unit. In this way, the filter sensor array can provide data that can be used to calculate filter overloading (e.g., using velocity sensor data and resistance sensor data). Furthermore, data from the dew point sensor and mold growth sensor can be used to estimate an amount of mold growth at one or more coils of the air handling unit. Such data can be further used to estimate and improve air quality.

In other instances, a motor sensor array can be part of the sensor array system connected to the air handling unit. The motor sensor array can include a vibration sensor, a power sensor, a voltage sensor, and/or temperature or humidity sensor. The motor sensor array can be located at each motor of an air handling unit in order to collect data related to the operation of the motor. For instance, the power sensor and/or voltage sensor of the motor sensor array can collect data related to energy usage of each motor, as well as energy efficiency of the motor. The vibration sensor of the motor sensor array can provide data related to a condition of the motor and wear of the fan connected to the motor.

In yet other instances, a coil sensor array can be part of the sensor array system connected to the air handling unit. The coil sensor array can include a resistance sensor, a velocity sensor, a temperature and/or relative humidity sensor, a dew point sensor, and/or a mold growth sensor. The coil sensor array can be connected to a heating and/or cooling coil of the air handling unit. The coil sensor array can be used assess whether material is accumulating on the heating and/or cooling coils. Additionally, the coil sensor array can be used to determine fouling of a humidifier using data obtained from resistance and velocity sensors. Data from the dew point sensor can be used to monitor water carryover issues, and data from the mold growth sensor can be used to monitor mold growth at the heating, cooling, and/or humidifier coils.

Furthermore, a duct sensor array can be part of the sensor array system connected to the air handling unit. The duct sensor array can include a deposition sensor, a PM sensor, and/or a temperature or humidity sensor. The duct sensor array can be attached to one or more ducts of the air handling unit, for example, at an air intake or air output duct of the air handling unit. When the air handling unit is installed in a building, such as a hospital, the air handling unit can include duct sensor arrays at air ducts that supply air to rooms in the building. The duct sensor array can be used to detect particulate depositions in duct sections. Data related to particulate deposition in ducts can be used to determine rates of particulate deposition, which can be used to determine filter efficiency.

In some instances, room sensor arrays can be part of the sensor array system connected to the air handling unit. Room sensor arrays can include pressure sensors, gas sensors, PM sensors, pathogen sensors, occupancy sensors, and/or temperature or relative humidity sensors. The room sensor arrays can be connected externally from the air handling unit. For example, the air handling unit can be part of a hospital and a room sensor array can be connected inside of an operating room and a patient room inside the hospital. The room sensor array can monitor a cleanliness of each room, and provide feedback regarding certain properties of the room (e.g., whether the room is over-pressurized, types of particles or pathogens in the room, occupancy of the room, etc.). Furthermore, a filter sensor array can be attached to a HEPA filter in each room in order to assess a performance of the air filtration system of the air handling unit. In this way, data from multiple sensor arrays can be compared in order to optimize performance of the air filtration system and/or the air handling unit.

Each sensor array can be connected to a network gateway that can communicate with a remote server that can include configuration information associated with the air handling unit. For instance, the remote server can store data that identifies the type of air handling unit, the type of air filtration system that operates in the air handling unit, owner information, motor specifications, filter specifications, room dimensions for any rooms connected to the air handling unit, and/or any other data useful for processing data collected from an air handling unit. The data from the sensor arrays can be used in combination with the data stored at the remote server to generate certain operating metrics. The operating metrics can (i) be presented to a user in order to make decisions regarding the operations of the air handling unit, and/or (ii) be used as feedback to control and optimize the operations of the air handling unit. Such operating metrics can include energy usage, air quality, energy loss, dust deposition, and/or any other metrics suitable for use when optimizing operations of an air handling unit.

Operating metrics can be transmitted from the remote server to local devices such as cell phone, tablets, and/or any other personal computing devices for visualizing the operating metrics and controlling the air handling unit. For instance, a personal computing device can include an interface for presenting histograms that are based on the operating metrics. Additionally, air quality related operating metrics can be presented at the interface in order that the user can ensure compliance with prescribed air quality limits. In some implementations, the remote server can calculate estimates of real-time cost of ownership and timing regarding when an optimal cost of ownership will be achieved. In other instances, the remote server can use operational limits and/or thresholds to determine when certain issues are occurring at the air handling unit. For example, a threshold can be associated with sensor array measurements related to moisture in order to determine when a filter is saturated with water or exhibiting some amount of mold growth.

Incorporating the sensor array system into an environment such as an industrial or residential building (e.g., a hospital, factory, and/or apartment complex) can promote efficiency of the air handling unit and air filtration system of the building. For instance, the sensor array system can measure, quantify, and/or log air, gas, and/or filter data to determine a filter economy, life cycle cost (LCC) and/or total cost of ownership (TCO) of a filter, an air handling unit, and/or an air filtration system. The sensor array system can also measure filter efficiency, air resistance, fan efficiency, and/or air velocity in order to make estimates of power usage in real-time (e.g., kilowatt hours in real-time). Certain conditions of the environment in which the sensor array system is installed can also be measured. Such conditions can include environmental metrics that change in real-time such as, for example, room temperature, air pressure, air content, humidity, room occupancy, air pollution, and/or any other environmental metric that can change in real-time. In this way, the sensor array system can generate real-time operational metrics such as indoor air quality (IAQ), bio-containment, pathogen identifiers, PM levels, and/or any other metrics related to air quality.

FIG. 1 illustrates a perspective view 100 of an air handling unit 102 for circulating air through a room 122. Typically, many air handling units rely on filter maintenance to improve efficiency of an air handling unit, however, such reliance neglects a variety of parameters that can also make an air handling unit more efficient. The air handling unit 102 of FIG. 1 can include a system of sensor arrays capable of communicating with each other, as well as with a remote device that can process data collected by sensors of the sensor arrays. Each sensor array can include multiple different sensors that are selected according to a portion of the air handling unit 102 they will be monitoring. Additionally, each sensor array can include, or be associated with one or more transmitters, capable of communicating using one or more different communication protocols (e.g., Bluetooth, Zigbee, WiFi, LTE, wired, and/or any other protocol with which to communicate between devices). In this way, operational data 128 can be collected at a sensor array and relayed over other sensor arrays in order to reach a gateway device that is capable of communicating all operational data from all sensor arrays to a remote device for further processing. In some implementations, an external device 126 (e.g., an air handling device such as an air filter, air humidifier, air de-humidifier, detector, etc.) can communicate with one or more sensor arrays. A sensor array can communicate data collected at the external device to the gateway device in order that the data from the external device can also be processed. The remote device can generate operational metrics from the data and use one or more algorithms (e.g., trend analysis, correlation analysis, machine learning techniques, etc.) to determine how to improve operations of the air handling unit 102.

In some implementations, the sensor array system of the air handling unit 102 can include a coil sensor array 104. The coil sensor array 104 can be located inside the air handling unit 102, proximate to or attached to a heating or cooling unit 106 of the air handling unit 102. The coil sensor array 104 can include a resistance sensor for measuring an amount of current resistance at the coils, a velocity sensor for measuring a velocity of air moving near the coils, a temperature or relative humidity sensor for measuring a temperature or relative humidity at the coils, a dew point sensor for measuring dew-point and/or moisture content at the coils, and/or a mold growth sensor for detecting whether mold is growing at or near the coils. It should be noted that the sensor arrays discussed herein can include any combination of one or more sensors.

The coil sensor array 104 can generate signals in response to environmental changes occurring at or near the coils of the air handling unit 102. The signals can be converted to operational data 128 that can be transmitted from the coil sensor array 104 at a first portion of the air handling unit 102 to a different sensor array at a different portion of the air handling unit 102. For instance, the operational data 128 from the coil sensor array 104 can be transmitted to a motor sensor array 108 of the sensor array system.

The motor sensor array 108 can be located inside or outside the air handling unit 102, proximate to a motor 110 of the air handling unit 102. The motor sensor array 108 can include a vibration sensor for measuring an amount of vibration occurring at the motor 110, a power sensor for measuring an amount of power consumed by the motor 110, a voltage sensor for measuring an amount of voltage that is being supplied to the motor 110, and/or a temperature or relative humidity sensor for measuring the temperature or humidity at the motor 110.

Data from both the motor sensor array 108 and the coil sensor array 104 can be used by a remote device, such as a server device, for generating operational metrics associated with the air handling unit 102. For instance, a motor efficiency operational metric can be calculated by the remote device using the sensor data from the motor sensor array 108 and the coil sensor array 104. The motor efficiency operational metric can indicate the motor 110 is operating efficiently when the velocity sensor of the coil sensor array 104 is detecting at least a threshold velocity of air, and the power sensor of the motor sensor array 108 is detecting less than a threshold amount of power consumed. When the motor efficiency operational metric indicates the motor 110 is not operating efficiently, the remote device can provide a signal back to the air handling unit for modifying an operation of the air handling unit 102. For instance, the remote device can cause the motor 110 to operate on a different schedule in order to save power, or operate the coils to consume less energy in order to compensate for the lack of efficiency of the motor 110.

In some implementations, the sensor array system of the air handling unit 102 can include a flow sensor array 112. The flow sensor array 112 can be connected at any portion of the air handling unit 102 where air flow may be more prominent or measurable, such as air intakes and air output ducts. The flow sensor array 112 can include a gas sensor for measuring types of gases, amounts of gases, and/or properties of gases that can be associated with the air handling unit 102. The flow sensor array 112 can also include PM sensor for detecting types of particles, buildup of particles, and/or any other property of particles that can be located within the air handling unit 102, and/or in a room 122 that receives air from the air handling unit 102. The flow sensor array 112 can also include a velocity sensor for measuring a velocity of air that is moving through the portion of the air handling unit 102 to which the flow sensor array 112 is attached. Additionally, the flow sensor array 112 can include a temperature and/or relative humidity sensor for detecting a temperature or relative humidity of air that is moving through a portion of the air handling unit 102 to which the flow sensor array 112 is attached.

In some implementations, data from the coil sensor array 104 and the flow sensor array 112 can be used by the remote device to determine fouling of a heating or cooling coil of the air handling unit 102, and/or deterioration of the heating or cooling coil of the air handling unit 102. For instance, a coil deterioration metric can be generated by the remote device using sensor data from the gas sensor of the flow sensor array 112 and sensor data from the resistance sensor of the coil sensor array 104. The remote device can identify a correlation between an amount of coil-related material (e.g., metallic particles) in the air and a change in resistance of the coil. The correlation can be used to quantify a coil deterioration metric. When the coil deterioration metric reaches a deterioration threshold, the remote device can provide a notification to a computing device (e.g., a personal computing device, cell phone, tablet, etc.) for notifying a user that the coil is deteriorating and affecting the efficiency of the air handling unit 102. In some implementations, when the coil deterioration metric reaches the deterioration threshold, the remote device can cause the air handling unit 102 to operate to mitigate further deterioration, for example, by limiting a frequency of temperature changes occurring at the coil.

In some instances, the sensor array system of the air handling unit 102 can include a duct sensor array 114 that can be located near a duct 116 that supplies or collects air from a room 122. The duct sensor array 114 can include deposition sensors, PM sensors, and/or temperature and/or humidity sensors. In this way, the duct sensor array 114 can collect data related to air content and air temperature for air that is in the room 122 and in the air handling unit 102. In some implementations, the sensor array can also include a filter sensor array 120 that is connected to, or proximate to, a filter portion 118 of the air handling unit 102. The filter portion 118 can include one or more filters that filter air traveling through the air handling unit 102. The filter sensor array 120 can include a resistance sensor for determining an air resistance at the filter portion 118, gas sensors for measuring an amount of gas and types of gas flowing through the filter portion 118, PM sensors for determining properties of particles entering and exiting the filters, velocity sensors for determining a velocity of air moving through the filters, temperature and/or relative humidity sensors for measure temperature and humidity of air moving through the filters, dew point sensors for measure a dew-point at or near the filter portion 118, and/or mold growth sensors for identifying any mold growth occurring at the filter portion 118.

In some implementations, one or more sensor arrays of the sensor array system can communicate with an external device, such as an air handling device 126. The external air handling device 126 can also include a sensor array, such as a room sensor array 124, which can collect data associated with the air in the room and the air flowing through the air handling unit 102 connected to the room 122. For instance, the room sensor array 124 can include a pressure sensor for measuring a pressure in the room 122, a gas sensor for measuring properties of gases in the room 122 (e.g., an amount of certain types of gases), a PM sensor for identifying particles in the room 122, a pathogen sensor for identifying an amount or types of pathogens in the room 122, and/or a temperature and/or a humidity sensor for measuring a temperature and/or humidity in the room 122.

Each of the room sensor array 124, the filter sensor array 120, and/or the duct sensor array 114 can be in communication using transmitters that are connected to or associated with each of the sensor arrays. Data collected by the sensor arrays can be transmitted from at least one of the transmitters of one of the sensor arrays to the remote device for further processing. For example, the remote device can use sensor data from the room sensor array 124, the filter sensor array 120, and the duct sensor array 114 to generate an air quality operational metric.

The air quality operational metric can be based on sensor data from the dew point sensor of the filter sensor array 120, sensor data from the deposition sensor of the duct sensor array 114, and sensor data from the PM sensor of the room sensor array 124. The air quality operational metric can be generated according to a correlation between a dew point detected at the filter portion 118, moisture detected at the duct, and certain particles detected in the room 122. When levels associated with such detected data indicate a correlation, the air quality operational metric can be generated using the correlation. Furthermore, if the air quality operational metric reaches a threshold, the remote device can cause the air handling device 126 and/or the air handling unit 102 to adjust its operations in order to improve the air quality. For instance, the remote device can cause the motor 110 to increase a velocity of the air in order to promote air filtration at the filter portion 118. In this way, sensor arrays at multiple different portions of the air handling unit 102 can be used to improve a variety of different operation conditions of the air handling unit 102. Furthermore, these improvements can be made through a number of different mechanisms such as changing motor operations, changing coil operations, changing filters, adjusting the air handling device 126, adjusting vents of the air handling unit 102, and/or modifying any other mechanism at the air handling unit 102.

Figure 2:
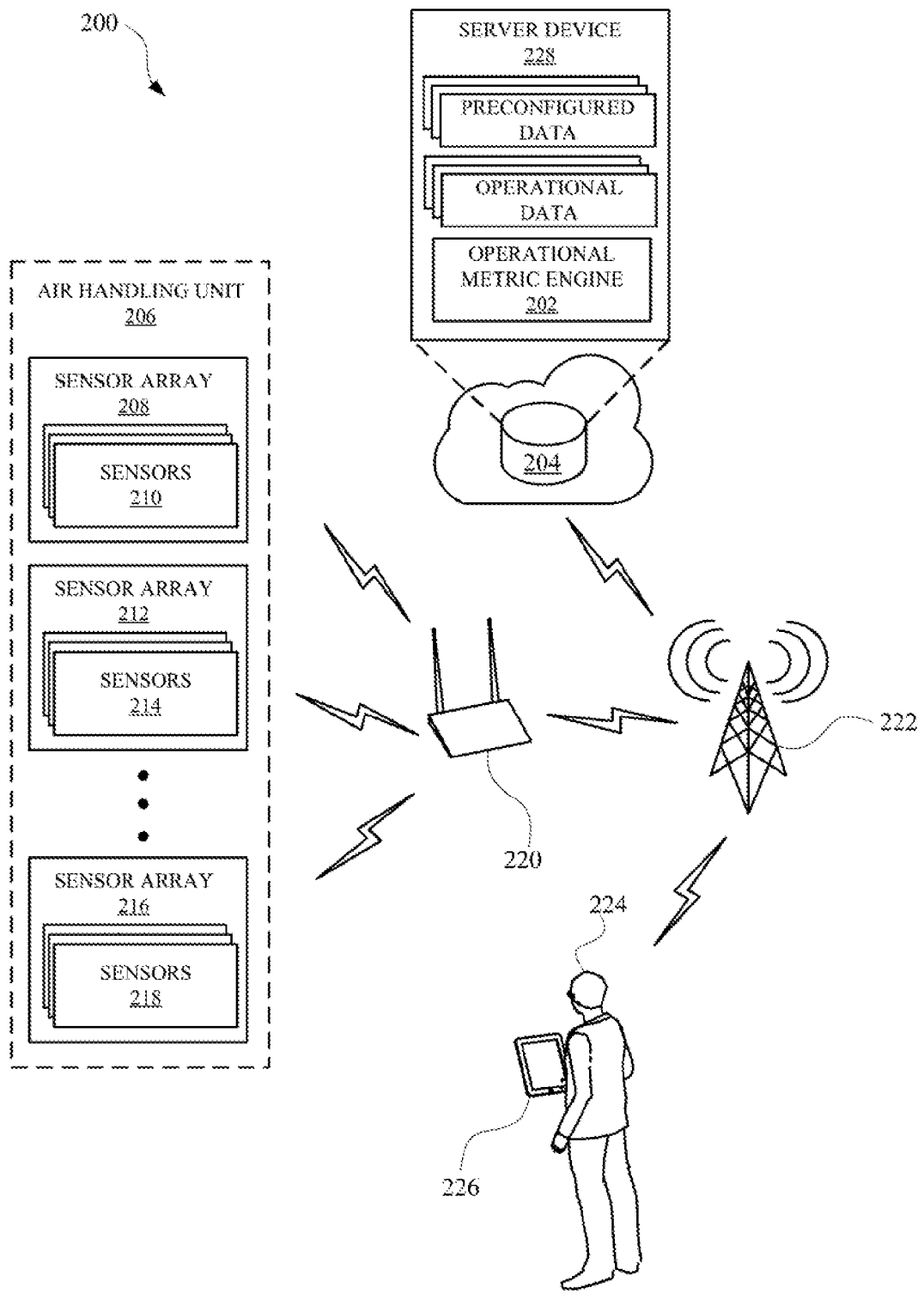
FIG. 2 illustrates a system for collecting and processing data from multiple sensor arrays of an air handling unit.

FIG. 2 illustrates a system 200 for collecting and processing data from multiple sensor arrays of an air handling unit 206. The system 200 can include an air handling unit 206 that includes one or more sensor arrays. For instance, the air handling unit 206 can include a first sensor array 208, a second sensor array 212, and an N-th sensor array 216, where "N" is any positive whole number. Each sensor array can include or be associated with one or more processors and one or more memory devices for managing data collected by the sensors of the sensor arrays. Furthermore, each sensor array can include or be associated with a transmitter for communicating with other sensor arrays and a network device 220, such as a router or other computing device capable of connecting to multiple devices over a network.

In some implementations, multiple sensor arrays can communicate sensor data to a single sensor array that communicated the sensor data to the network device 220. For example, the first sensor array 208 can include one or more sensors 210, the second sensor array 212 can include one or more sensors 214, and the N-th sensor array 216 can include one or more sensors 218. Sensor data from the sensors can be transmitted from a transmitter of each respective sensor array to a certain sensor array that acts as an intermediary between the network device 220 and the sensor arrays. In this way, various portions of the air handling unit 206 can include sensor arrays despite not being proximate to the network device 220 because the sensor arrays can relay sensor data from other sensor arrays. In other words, the sensor arrays can be connected as a mesh network that can communicate to other devices through a network 222. Moreover, each sensor array can be battery operated such that each sensor array does not necessarily have to be located near a power outlet or hard-wired to a power source.

In some implementations, the network device 220 can be connected over a network 222 to a remote device 204, such as a server device 228, or any other computing device capable of processing data. The server device 228 can include preconfigured data associated with specifications of the air handling unit 206 and/or each sensor array. For example, the preconfigured data can identify a size of the air handling unit 206, power specifications of the air handling unit 206, devices attached to the air handling unit 206, a location of the air handling unit 206, a business associated with the air handling unit 206, filter specifications for the air handling unit 206, codes or regulations associated with the air handling unit 206, historical operational data associated with the air handling unit 206, and/or any other data that can be associated with the air handling unit 206.

The server device 228 can also include operational data 128, which can be data that is collected from the sensors 210, sensors 214, and/or sensors 218 of the sensor arrays of the air handling unit 206. The operational data can include moisture data, power data, resistance data, air velocity data, pathogen data, gas data, temperature data, filter data, and/or any other data that can be collected by a sensor associated with an air handling unit. The operational data can be collected over time in order to identify trends and correlations in the operational data, as well as the preconfigured data. For instance, the server device 228 can include an operational metric engine 202 for (i) identifying trends and/or correlations in the preconfigured data and the operational data, and (ii) generating operational metrics based on the preconfigured data and the operational data. It should be noted that the operational metric engine 202 can be included on the remote device 204, a personal computing device 226, a computing device that is part of a sensor array, and/or any other device that can be in communication with a sensor of an air handling unit.

In some instances, the operational metric engine 202 can include one or more algorithms for generating operational metrics associated with the air handling unit 206. The operational metrics can be generated according to an artificial intelligence or machine learning algorithm, in some implementations. For example, a regression algorithm and/or a classification algorithm can be employed as a machine learning algorithm at the operational metric engine 202. The machine learning algorithm can use data from multiple different sensor arrays (e.g., the filter sensor array 120, the flow sensor array 112, the motor sensor array 108, the duct sensor array 114, room sensor array 124, and/or the coil sensor array 104). The operational metrics provided by the operational metric engine 202 can be based on results from the machine learning algorithm.

In some implementations, trends and correlations can be identified using pattern recognition algorithms, extrapolation, interpolation, averages, integrals, derivatives, and/or any other techniques for identifying trends or patterns in data. Trends and/or correlations can be used by the operational metric engine 202 to generate operational metrics that can provide indications of performance of the air handling unit 206. For example, a correlation, such as data being directly proportional or indirectly proportional to other data, can be used to determine an efficiency metric for the air handling unit 206. A motor efficiency metric can be generated as a percentage, where 100% indicates maximum efficiency and 0% indicates no efficiency. The motor efficiency metric can be based on at least power data from a power sensor of the motor sensor array, velocity data from a velocity sensor of the filter sensor array, and/or pressure data from a pressure sensor of the room sensor array. When each of these data values stays within a threshold for each respective type of data, the motor efficiency metric can be 100%. However, when one of the data values falls out of its respective threshold, the motor efficiency metric can be 66%, and/or any other value indicating that the motor efficiency has declined. In this way, even when data from filter sensor array is indicating poor performance of the air handling unit 206, there may be other culprits of the poor performance. In other words, the filter of the air handling unit 206 may not be problematic, rather, other portions of the air handling unit 206 may prove to be problematic upon further analysis of the data from the sensors of the sensor arrays.

In some implementations, the server device 228 and/or the sensor arrays can communicate over the network 222 to a personal computing device 226, such as a cell phone, laptop computer, desktop computer, tablet computer, and/or any other computing device. The operational metrics and/or sensor data can be presented at an interface of the personal computing device 226 to allow a user 224 to visualize and track the operating environment of the air handling unit 206. In some instances, the personal computing device 226 can present graphs, such as histograms or line graphs, which can provide insights into the data that is being collected by the sensor arrays. For example, gas data from a gas sensor of a filter sensor array and velocity data from a velocity sensor of a flow sensor array 112 can be used by the operational metric engine 202 to generate filter operational metrics. The filter operational metrics can be presented at the personal computing device 226 in the form of a histogram for comparing performance of the filters in the air handling unit 206. If a filter in the air handling unit 206 is operating poorly, the user 224 can adjust an operation of the air handling unit 206 in order to compensate for the poorly operating filter. Alternatively, the server device 228 can automatically recognize the filter that is operating poorly and adjust an operation of the air handling unit 206 to compensate for the poorly operating filter. For instance, the user 224 or the server device 228 can adjust an operation of a motor that is closest to the poorly operating filter in order to promote gas movement through the filter and reduce an amount of moisture collecting at the filter.

In some instances, the personal computing device 226 can use data from the sensor arrays and/or the server device 228 to present metrics associated with cost of ownership. Furthermore, the personal computing device 226 can present options for adjusting the operations of the air handling unit 206 in order to lower the cost of ownership of the air handling unit 206. When the user selects an option to adjust the operations of the air handling unit 206, the personal computing device 226 can present the user 224 with a timeline or countdown to when the cost of ownership will actually be lowered as a result of the adjustments in operation. For example, the preconfigured data can include billing cycle data that allows the server device 228 to calculate charges that will occur for each billing cycle, and when the charges will lower as a result of the operational adjustments.

Portions of the system 200 can operate in an environment such as an industrial or residential building (e.g., a hospital, manufacturing facility, condominium, etc.) for measuring, quantifying, and logging data related to the environment. For instance, the sensor array system can measure, quantify, and/or log data related to air or gas filters in the environment, and the server device can use the data to determine certain operational metrics about the filters. The measured data can include filter efficiency, air resistance of a filter, fan efficiency, air velocity through an air handling unit, and/or any other metric related to air in the environment. The operational metrics can include a real-time LCC, real-time TCO, and/or real-time power consumption. Such operational metrics can be used to select filters and equipment that can improve the efficiency and lower costs associated with circulating clean air in the environment. Furthermore, a server device can store desired operational goals, such as a desired indoor air quality, a bio-contaminant level, a pathogen level, a PM level, and/or any air-related setting. The server device can use the measured data from the sensor array system and/or stored data at the server device to control an air handling unit and/or air filtration system to reach the operational goals.

Figure 3:
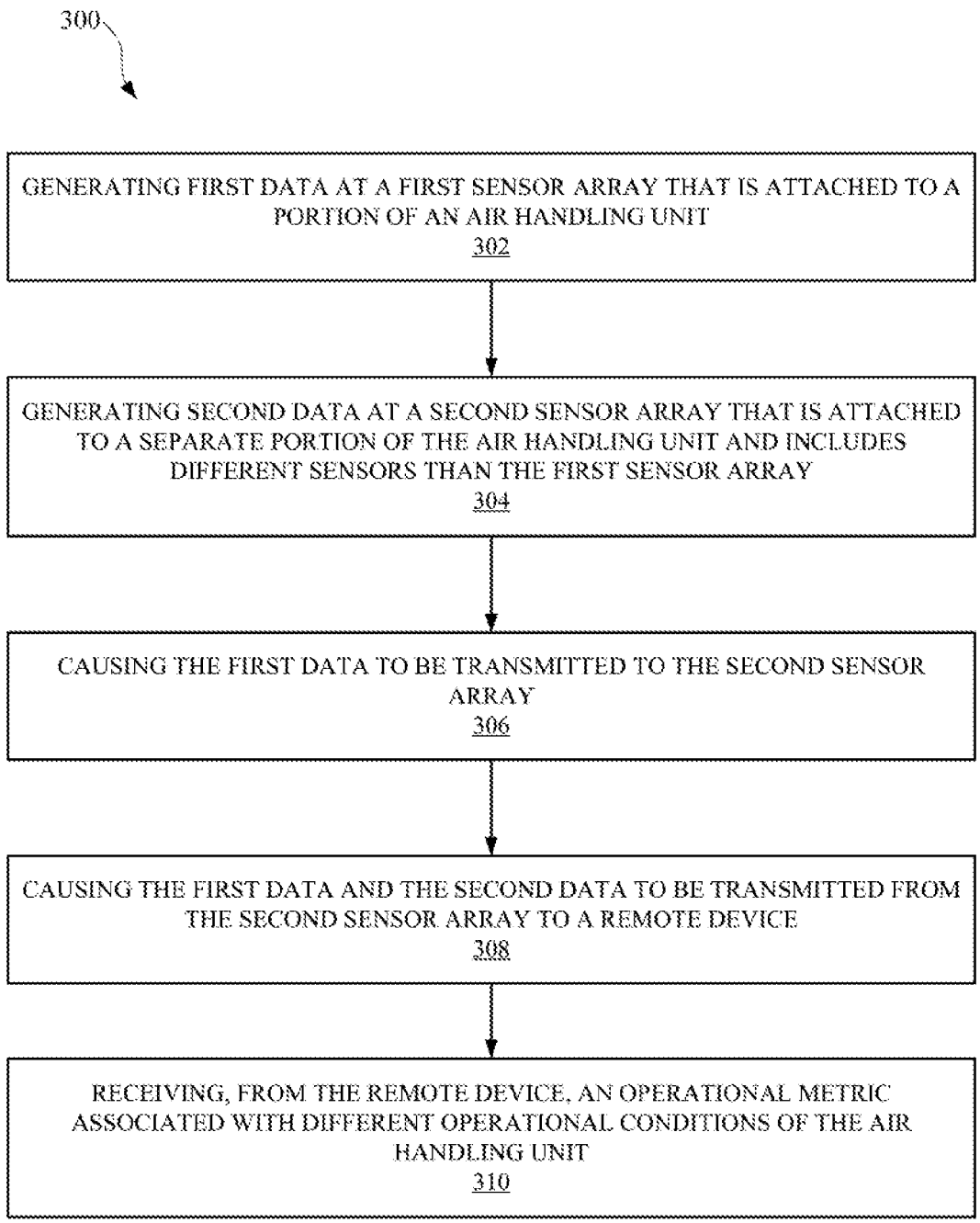
FIG. 3 illustrates a method for collecting data from multiple different sensor arrays of an air handling unit.

FIG. 3 illustrates a method 300 for collecting data from multiple different sensor arrays at an air handling unit. The method 300 can be performed by a sensory array system, an air handling unit, a computing device, a server device, and/or any other apparatus capable of communicating with sensors. The method 300 can include a block 302 of generating first data at a first sensor array that is attached to a portion of an air handling unit. The first sensor array can include multiple different sensors that are in communication with a processor, memory, and/or transmitter for communicating with other sensor arrays. Furthermore, the first sensor array can be physically attached to the air handling unit or separate from the air handling unit for collecting data related to an environment of the air handling unit.

Block 304 of method 300 can include generating second data at a second sensor array that is attached to a separate portion of the air handling unit and includes different sensors than the first sensor array. The second sensor array can be located at a separate portion of the air handling unit relative to the first sensor array and measure one or more different operating conditions of the air handling unit. The second sensor array can be in communication with a network device that can act as a gateway for multiple sensor arrays to communicate over a wide area network (e.g., the internet). The second sensor array can include one or more transmitters for communicating according different protocols. For instance, the second sensor array can include a first transmitter for communicating with other sensor arrays (e.g., via Bluetooth, WiFi, and/or LTE) and a second transmitter for communicating with a network device or network server (e.g., via Bluetooth, WiFi, and/or LTE). Alternatively, the second sensor array can include a single transmitter that is capable of communicating with other sensor arrays as well as network devices that are connected to a wide area network.

Block 306 of method 300 can include causing the first data to be transmitted to the second sensor array. The second sensor array can include memory for storing the first data and the second data. In this way, the first sensor array and the second sensor array can act as a mesh network capable of re-transmitting collected sensor data over distances to a wide area network without the need for a direct connection between all sensor arrays and a network device.

Block 308 of method 300 can include causing the first data and the second data to be transmitted from the second sensor array to a remote device. The first data and the second data can be transmitted from the second sensor array to a network device that is connected to the remote device. The remote device can be a remote server or other computing device capable of processing network data. In some instances, the remote server can include an operational metric engine for processing the first data and the second data, and providing operational metrics from the first data and the second data. In other instances, the remote server can store or otherwise access preconfigured data related to the air handling unit and/or the sensor arrays. In this way, the operational metrics can be based on the first data, the second data, and the preconfigured data related to the air handling unit and/or the sensor arrays.

Block 310 of method 300 can include receiving, from the remote device, an operational metric associated with different operational conditions of the air handling unit. The operational metric can be generated from at least the first data and the second data. Additionally, each of the first sensor array and the second sensor array can monitor different operational conditions of the air handling unit, therefore the operational metric can be used to diagnose issues with those or other operational conditions of the air handling unit. In some instances, the operational metric can be generated using statistical and/or machine learning algorithms that identify trends, patterns, and/or correlations in the first data, the second data, and/or the preconfigured data, as discussed herein.

Figure 4:
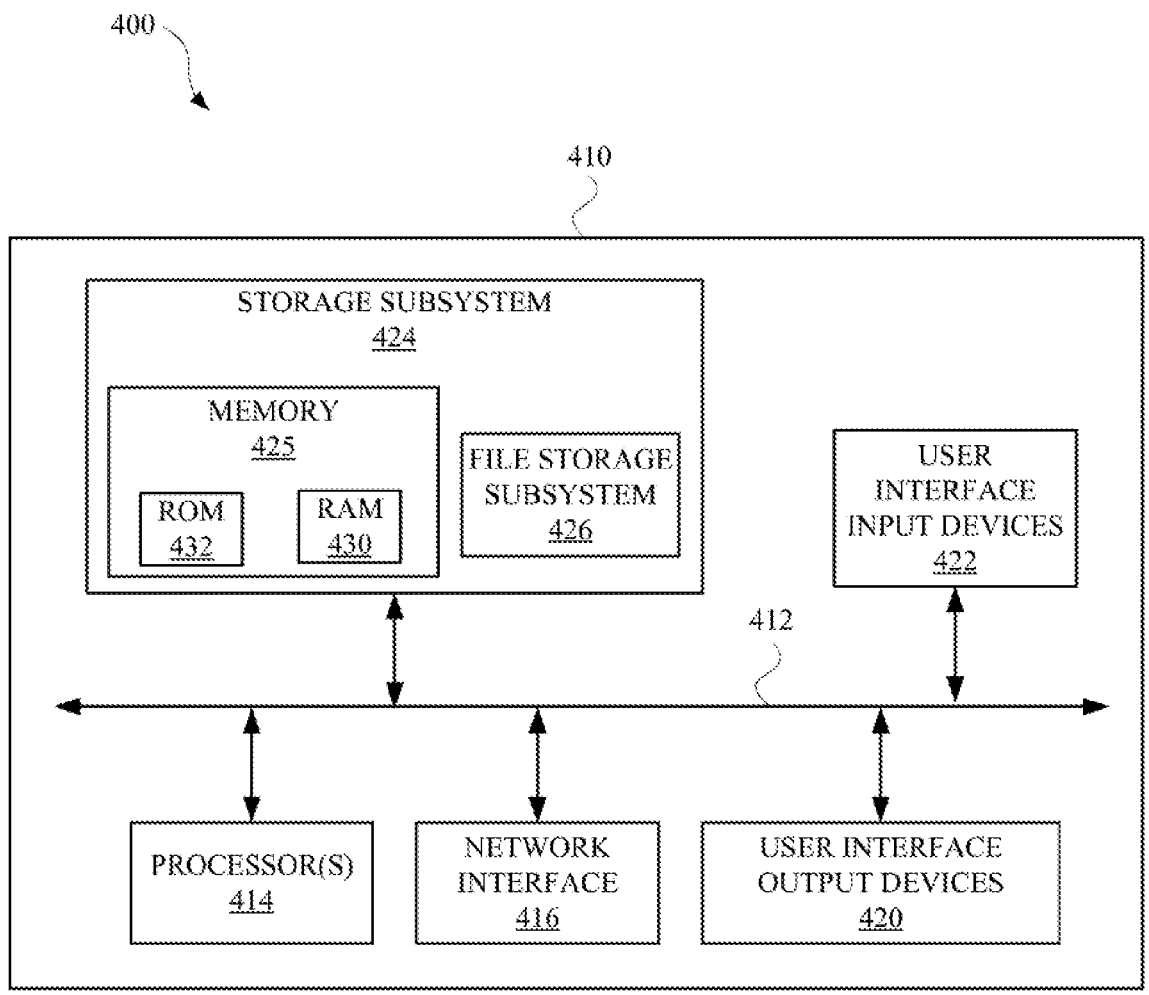
FIG. 4 is a block diagram of an example computer system.

FIG. 4 is a block diagram of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, the claims, and/or to implement one or more of the air handling unit, the sensor arrays, the server device, the remote device 204, the network device 220, the personal computing device 226, and/or any other system, method, and/or apparatus discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A system, comprising:
a first sensor array comprising
   (i) a first transmitter and
   (ii) a first set of sensors for collecting first sensor data associated with an operation of an air handling unit;
a second sensor array in communication with the first sensor array, the second sensor array comprising
   (i) a second set of sensors for collecting second sensor data associated with the operation of the air handling unit, wherein the second set of sensors are different than the first set of sensors and
   (ii) a second transmitter for receiving, from the first transmitter, the first sensor data collected by the first set of sensors, wherein the first sensor array and the second sensor array are connected to different portions of the air handling unit;
an air handling device that is external to the air handling unit configured to receive data, wherein the air handling device is an air filtering device, an air humidifying device, and/or an air de-humidifying device, and wherein the air handling device includes a room sensor array for collecting third sensor data associated with a room containing the air handling device, wherein the room sensor array includes a third set of sensors and a third transmitter;

a network device in communication with the first sensor array, the second sensor array, the third sensor array, and the air handling device, the network device configured to
- (i) transmit the first sensor data, the second sensor data, the third sensor data, and the received data to a remote computing device for processing, and
- (ii) receive, from the remote computing device, an operational metric associated with the operation of the air handling unit and the received data from the air handling device.

2. The system of claim 1, wherein the first sensor array is connected to a filter of the air handling unit and the second sensor array is connected to an inlet duct or outlet duct of the air handling unit.

3. The system of claim 2, wherein the operational metric is associated with an efficiency of a motor and the operation is an air pumping operation performed by the motor.

4. The system of claim 3, wherein the first sensor array includes a velocity sensor and a dew point sensor, and the second sensor array includes a deposition sensor and a temperature sensor.

5. The system of claim 3, further comprising:
a processor configured to cause the air pumping operation to change according to the operational metric.

* * * * *